No. 755,824. PATENTED MAR. 29, 1904.
J. E. WOODBRIDGE.
MEANS FOR STARTING ALTERNATING CURRENT DYNAMO ELECTRIC MACHINES.
APPLICATION FILED SEPT. 11, 1901.
NO MODEL.
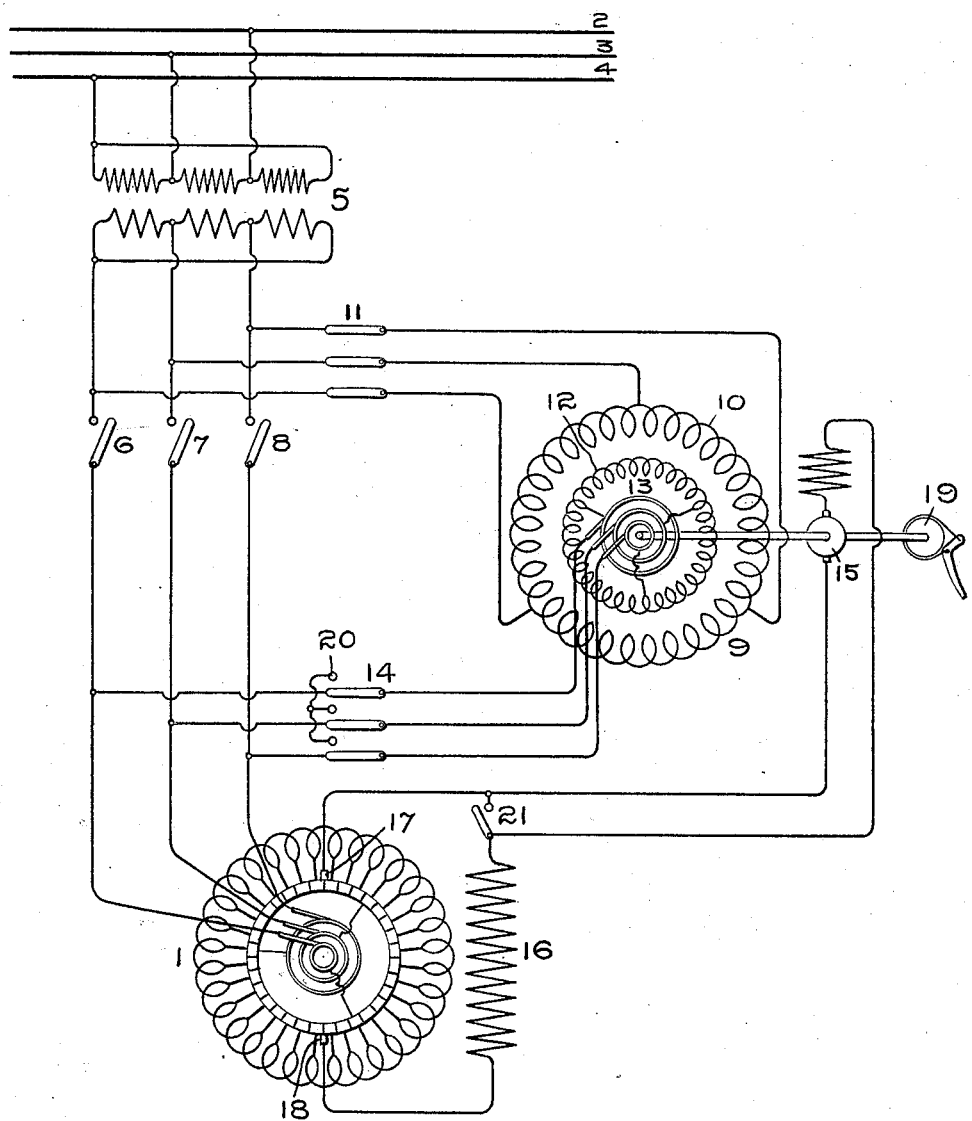
Witnesses
Marcus L. Byng.
Mabel H. Emerson
Inventor
Jonathan E. Woodbridge,
by Albert B. Davis
Atty.

No. 755,824. Patented March 29, 1904.

UNITED STATES PATENT OFFICE.

JONATHAN E. WOODBRIDGE, OF SCHENECTADY, NEW YORK, ASSIGNOR TO GENERAL ELECTRIC COMPANY, A CORPORATION OF NEW YORK.

MEANS FOR STARTING ALTERNATING-CURRENT DYNAMO-ELECTRIC MACHINES.

SPECIFICATION forming part of Letters Patent No. 755,824, dated March 29, 1904.

Application filed September 11, 1901. Serial No. 74,997. (No model.)

*To all whom it may concern:*

Be it known that I, JONATHAN E. WOODBRIDGE, a citizen of the United States, residing at Schenectady, in the county of Schenectady and State of New York, have invented certain new and useful Improvements in Means for Starting Alternating-Current Dynamo-Electric Machines, of which the following is a specification.

My present invention comprises certain improvements particularly useful for starting alternating-current machines—such, for example, as rotary converters or the like.

It comprises means whereby an electromotive force of gradually-increasing frequency may be impressed upon the machine to be started and also means whereby the field of the machine may be excited by direct current.

The drawing accompanying this specification represents diagrammatically one embodiment of my invention, the details of which will be best understood by reference to the following description.

The scope of the invention, both in its broader and more limited aspects, is to be determined in the usual manner by consideration of the claims appended hereto.

Referring to the drawing in detail, the machine (indicated at 1) represents diagrammatically a rotary converter, in this case shown as of the three-phase type. Three-phase mains 2 3 4 represent a source of current to which it may be desired periodically to connect the rotary. A set of three-phase step-down transformers 5 serves to reduce the electromotive force of the mains 2 3 4 to a value or values adapted to the requirements of the rotary 1, while switches 6 7 8 serve to make or break connection between the secondary of the set of transformers 5 and the alternating-current leads of the rotary.

In order to bring the rotary converter 1 up to synchronism, so that it may be connected to the mains 2 3 4, I make use of a frequency-changer, (indicated at 9.) This frequency-changer closely resembles an ordinary induction-motor, both members of which are provided with definite windings. One of the members 10, which may be called the "inducing" member, has its terminals connected through switches 11 to the secondary terminals of the transformer-set 5. The other member, 12, has its three leads or terminals extending through collector-rings 13 and connected through a set of switches 14 to the rotary-converter leads or terminals, as shown.

Mounted upon the shaft of the frequency-changer is the armature 15 of a small series-wound direct-current generator.

The machine as a whole is connected in series with the field-winding 16 of the rotary converter, which latter winding derives its current normally from connections across the commutator-brushes 17 18 of the converter.

A friction or other suitable brake 19 is arranged to act upon the shaft of the frequency-changer. The particular type of brake is wholly immaterial, although for purposes of convenience I have in the drawing illustrated an ordinary friction-brake of the strap type.

The action of the starting device will now be readily understood. In starting the rotary converter the frequency-changer is first gotten up to speed, and this is done by close-circuiting the windings of the induced member 12, the result being accomplished in the present instance by throwing the set of switches 14 onto a corresponding number of electrically-connected contacts 20. This short-circuits the winding 12, which thereupon speeds up until its rate of rotation is nearly synchronous with the impressed field of the inducing member 10, to which of course current is assumed to be supplied from the transformer set 5. When the frequency-changer is thus revolving at full speed, a current of very low frequency is impressed upon the rotary converter 1. At the same time the boosting-generator 15, which, it should be mentioned, is connected so as to add its electromotive force to that supplied from the commutator of the rotary converter, being now run at full speed furnishes current for exciting the field 16 of the said rotary converter. The brake 19 is then applied, so as to gradually reduce the speed of the rotating member of the frequency-changer until it finally comes to rest. Under these conditions it will be evident that as this rotating member decreases in speed the frequency of current supplied therefrom correspondingly increases until when the rotating member is at standstill the normal frequency of the mains 2 3 4 is impressed upon the rotary converter. While the speed of the rotating member of the frequency-changer is gradually being decreased, thereby decreasing the electromotive force of the booster 15, the electromotive force furnished by the converter itself gradually increases, the decrease in electromotive force of the booster being practically compensated for by the increase in electromotive force of the rotary converter. The result is the maintenance of a practically constant field excitation for the rotary. When the frequency-changer has been brought to standstill, the booster 15 ceases to produce any electromotive force and may therefore be cut out of circuit by means of the short-circuiting switch 21.

In order to adjust the phase relation of the rotary with respect to the electromotive force of the mains 2 3 4, the rotating member of the frequency-changer may be allowed to slip slowly until the desired adjustment is attained, as indicated by any usual synchronism-indicating means. When the desired adjustment is secured, the switches 6 7 8 may be thrown, connecting the rotary to the supply-mains, after which the frequency-changer or starting device may be cut out of circuit.

What I claim as new, and desire to secure by Letters Patent of the United States, is—

1. The combination of an alternating-current dynamo-electric machine, a frequency-changer for supplying current to said dynamo-electric machine for starting the same, a direct-current generator driven by the frequency-changer, and means for initially exciting the field of said dynamo-electric machine from said direct-current generator.

2. The combination of an alternating-current dynamo-electric machine, means for impressing upon said machine an electromotive force of gradually-increasing frequency, and means for exciting the field of said dynamo-electric machine by the resultant effect of two electromotive forces one of which decreases while the other increases.

3. The combination of an alternating-current dynamo-electric machine, a frequency-changer, a direct-current generator driven by the frequency-changer, means for restraining the tendency to rotation of the movable member of the frequency-changer, connections between said direct-current generator and the field of said dynamo-electric machine, and means for cutting the direct-current generator out of circuit.

4. The combination of a rotary converter, a frequency-changer for starting said rotary converter, and means for exciting the field of said rotary converter by the joint action of the rotary converter itself and a source of electromotive force which varies inversely with the variation of frequency of current supplied to the rotary converter.

5. The combination of a rotary converter, a frequency-changer, and a direct-current generator adapted to be connected in series with the field-circuit of the rotary converter.

6. The combination of a rotary converter provided with a shunt field, a source of variable electromotive force in series with said field, and means for cutting said source out of circuit.

7. The combination of a rotary converter provided with a shunt field, an external source of direct current, and means for connecting the shunt field either directly across the brushes of the rotary converter or so as to include said source of direct current in series therewith.

8. The combination of a rotary converter, means for starting the rotary converter from the alternating-current side, and means for supplying current to the field of the rotary converter from the rotary converter itself both while it is coming up to speed and after it is in normal operation.

9. The combination of a rotary converter, a frequency-changer for supplying starting-current to the rotary converter, a direct-current generator driven by the frequency-changer, and connections whereby the field of the rotary converter is excited by the joint action of the rotary converter itself and said direct-current generator.

10. The combination with a rotary converter provided with a shunt field, of a source of variable electromotive force, and a circuit connecting said source in series with said shunt field.

In witness whereof I have hereunto set my hand this 9th day of September, 1901.

JONATHAN E. WOODBRIDGE.

Witnesses:
MASEL H. EMERSON,
G. C. HOLLISTER.